(12) United States Patent
Kim

(10) Patent No.: US 8,593,386 B2
(45) Date of Patent: Nov. 26, 2013

(54) DISPLAY DEVICE

(75) Inventor: Dong-gyu Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 860 days.

(21) Appl. No.: 12/135,783

(22) Filed: Jun. 9, 2008

(65) Prior Publication Data

US 2009/0033608 A1 Feb. 5, 2009

(30) Foreign Application Priority Data

Aug. 1, 2007 (KR) ........................ 10-2007-0077434

(51) Int. Cl.
*G09G 3/36* (2006.01)

(52) U.S. Cl.
USPC ........................................................... 345/92

(58) Field of Classification Search
USPC ..................................... 345/88, 92; 257/154
See application file for complete search history.

(56) References Cited

U.S. PATENT DOCUMENTS

| 2001/0007362 | A1* | 7/2001 | Ha et al. | 257/154 |
|---|---|---|---|---|
| 2004/0012554 | A1* | 1/2004 | Song et al. | 345/92 |
| 2005/0168423 | A1* | 8/2005 | Hirata et al. | 345/88 |
| 2006/0262069 | A1* | 11/2006 | Do et al. | 345/98 |
| 2007/0080914 | A1* | 4/2007 | Sun et al. | 345/88 |
| 2007/0182902 | A1* | 8/2007 | Chung et al. | 349/129 |
| 2007/0229430 | A1* | 10/2007 | Wang et al. | 345/96 |
| 2008/0018578 | A1* | 1/2008 | Ku | 345/90 |

FOREIGN PATENT DOCUMENTS

| JP | 2001-042287 | 2/2001 |
|---|---|---|
| JP | 2003-233362 | 8/2003 |
| JP | 2004-341134 | 12/2004 |
| JP | 2006-189610 A | 7/2006 |
| JP | 2007-156495 | 6/2007 |
| WO | 2005/079167 A | 9/2005 |

OTHER PUBLICATIONS

International Search Report corresponding to International Application No. PCT/KR 2004/001868, Oct. 27, 2005.

* cited by examiner

*Primary Examiner* — Quan-Zhen Wang
*Assistant Examiner* — Tony Davis
(74) *Attorney, Agent, or Firm* — Innovation Counsel LLP

(57) ABSTRACT

A display device includes: a first display substrate having a plurality of pixel electrodes, a plurality of data lines disposed parallel with each other and that cross a center portion of the pixel electrodes, a plurality of gate lines that cross the data lines, and a plurality of driving thin film transistors connected with the data lines, the gate lines and the pixel electrodes; a second display substrate disposed opposite to the first display substrate having a common electrode, a liquid crystal layer disposed between the first display substrate and the second display substrate; wherein one of the data lines supplies a data voltage to the pixel electrodes crossed by the one of the data lines and to the pixel electrodes crossed by the adjacent one of the data lines alternately along a longitudinal direction of the data lines.

20 Claims, 8 Drawing Sheets

DISPLAY DEVICE

CROSS-REFERENCE TO RELATED APPLICATIONS

This application claims priority from Korean Patent Application No. 10-2007-0077434, filed on Aug. 1, 2007 in the Korean Intellectual Property Office, the disclosure of which is incorporated herein by reference.

BACKGROUND OF INVENTION

1. Field of Invention

Apparatus consistent with the present invention relates to a display device and, more particularly, to a display device having improved image quality.

2. Description of Related Art

To overcome the poor viewing angle exhibited by LCD display devices, a vertically aligned (VA) mode multi-domain structure is sometimes used which divides a pixel into a plurality of domains. In the VA mode, the major axis of the liquid crystal molecules is oriented vertically with respect to the opposite substrates. A pixel refers to a minimum unit displaying an image. The LCD device of VA mode induces the liquid crystal in the respective domains to have a pre-tilt direction that is different for each domain.

However, the LCD device using the VA mode with multi domain structure has a lower aperture ratio and the display device will have lower light efficiency.

An LCD device may be generally driven by dot reverse driving or column reverse driving.

However, it is difficult to drive at high speed more than 120 Hz using the dot reverse driving way since gate line turn-on time or activation time is reduced by half compared to driving at 60 Hz.

If column reverse driving way is applied when driving at 120 Hz or more, changes in the electrical capacitance between the data line and the pixel electrode caused by variation in the overlap between the data line and the pixel electrode become very sensitive compared to dot reverse driving. This may cause cross-talk in the image displayed.

SUMMARY OF INVENTION

Accordingly, it is an aspect of the present invention to solve the mentioned problems and to provide a display device of an enhanced aperture ratio and image characteristic, wherein a column reverse driving way is used.

The foregoing and/or other aspects of the present invention can be achieved by providing a display device comprising: a first display substrate which comprises a plurality of pixel electrodes, a plurality of data lines which are disposed parallel with each other and cross a center portion of the pixel electrodes, a plurality of gate lines which cross the data lines, and a plurality of driving thin film transistors which are respectively connected with the data lines, the gate lines and the pixel electrodes; a second display substrate which is disposed opposite to the first display substrate and comprises a common electrode, and; a liquid crystal layer which is disposed between the first display substrate and the second display substrate; wherein one of the data lines supplies a data voltage to the pixel electrodes crossed by the one of the data lines and to the pixel electrodes crossed by the adjacent one of the data lines alternately along a longitudinal direction of the data lines.

The pixel electrodes may connect to the one of the data lines supplied with the same polarity of the data voltage and supplied with a different polarity of the data voltage from the adjacent data line.

Each driving thin film transistor may be connected with only one data line among the plurality of data lines and is disposed at a position corresponding to an edge portion of the each pixel electrode, each of the data lines may be connected alternately with the driving thin film transistors disposed at its opposite sides along the longitudinal direction of the data lines. The plurality of driving thin film transistors may be connected at one side of the pixel electrodes.

Each driving thin film transistor may be connected with only one data line among the plurality of data lines and is disposed at a position corresponding to an edge portion of the each pixel electrode. The one of the data lines may be connected with the adjacent driving thin film transistors disposed at the same side direction with respect to the one of the data lines. The plurality of driving thin film transistors may be connected alternately with the pixel electrodes disposed at opposite sides of the data lines along the longitudinal direction of the data lines.

The pixel electrodes may comprise first pixel electrodes and second pixel electrodes adjacent to the first pixel electrodes in the longitudinal direction of the data lines and supplied with the data voltage from the adjacent data line. The first pixel electrodes may comprise first major pixel electrodes and first minor pixel electrodes and, the second pixel electrodes may comprise second major pixel electrode and the second minor pixel electrode.

The plurality of gate lines may comprise first gate lines and second gate lines, the first gate lines may comprise first major gate line supplying a gate signal to the driving thin film transistors connected with the first major pixel electrodes, and first minor gate lines supplying a gate signal to the driving thin film transistors connected with the first minor pixel electrodes. The second gate lines may comprise second major gate line supplying a gate signal to the driving thin film transistors connected with the second major pixel electrodes, and second minor gate lines supplying a gate signal to the driving thin film transistors connected with the second minor pixel electrodes.

The first major gate lines and the first minor gate lines may supply the same gate signal, and the second major gate lines and the second minor gate lines may supply the same gate signal.

The first display substrate may further comprise: a storage electrode line formed parallel with the gate lines; a storage electrode pad and a charging thin film transistor connected with one of the second major gate lines, one of the first minor pixel electrodes and the storage electrode pad.

The first major gate lines and the first minor gate lines may supply different gate signals and the second major gate lines and the second minor gate lines may supply different gate signals.

The first major pixel electrodes and the second major pixel electrodes may be directly connected with the driving thin film transistors and the first minor pixel electrodes and the second minor pixel electrodes may be indirectly connected with the driving thin film transistors through coupling capacitances.

The first display substrate may further comprise a color filter disposed between the pixel electrodes and the data lines.

At least one of the pixel electrodes and the common electrode may comprise a micro-slit pattern dividing a pixel region disposed with the pixel electrodes into a plurality of domains.

The micro-slit pattern may comprise: at least one vertical part overlapped with the data lines; at least one transverse part crossing the vertical part; and a plurality of slant parts may extend from at least one of the vertical part and the transverse part.

The liquid crystal layer may comprise vertically oriented liquid crystal molecules and an ultra violet ray cured type monomer, and the micro-slit pattern and the ultra violet ray cured type monomer pre-tilt the liquid crystal molecules in a direction different from each other in each domain.

At least one of the pixel electrodes and the common electrode may comprise a cut pattern wherein the cut pattern divides a pixel region of the pixel electrodes into a plurality of domains.

The cut pattern may comprise a first cut pattern overlapped parallel with the data lines and a second cut pattern crossing the data lines in a slant direction.

The display device may further comprise: a first orientation film disposed on the pixel electrodes of the first display substrate; and a second orientation film may dispose on the common electrode of the second display substrate, and at least one of the first orientation film and the second orientation film may divide each pixel electrode into a plurality of domains.

Some of boundaries of the plural domains may be overlapped parallel with the data lines.

BRIEF DESCRIPTION OF DRAWINGS

The above and/or other aspects and advantages of the present invention will become apparent and more readily appreciated from the following description of the embodiments, taken in conjunction with the accompanying drawings of which.

DETAILED DESCRIPTION OF EXEMPLARY EMBODIMENTS

A display panel using amorphous silicon (a-Si) for thin film transistor (TFT) formed through 5-mask process as exemplary embodiment is briefly illustrated in the appended figures. However, the present invention is not restricted to the exemplary embodiment but may be embodied in various different forms.

Further, a liquid crystal display panel of vertically aligned (VA) mode dividing one pixel in a plurality of domains is illustrated. The pixel refers to a minimum unit that displays an image.

First Exemplary Embodiment

Figure 1:
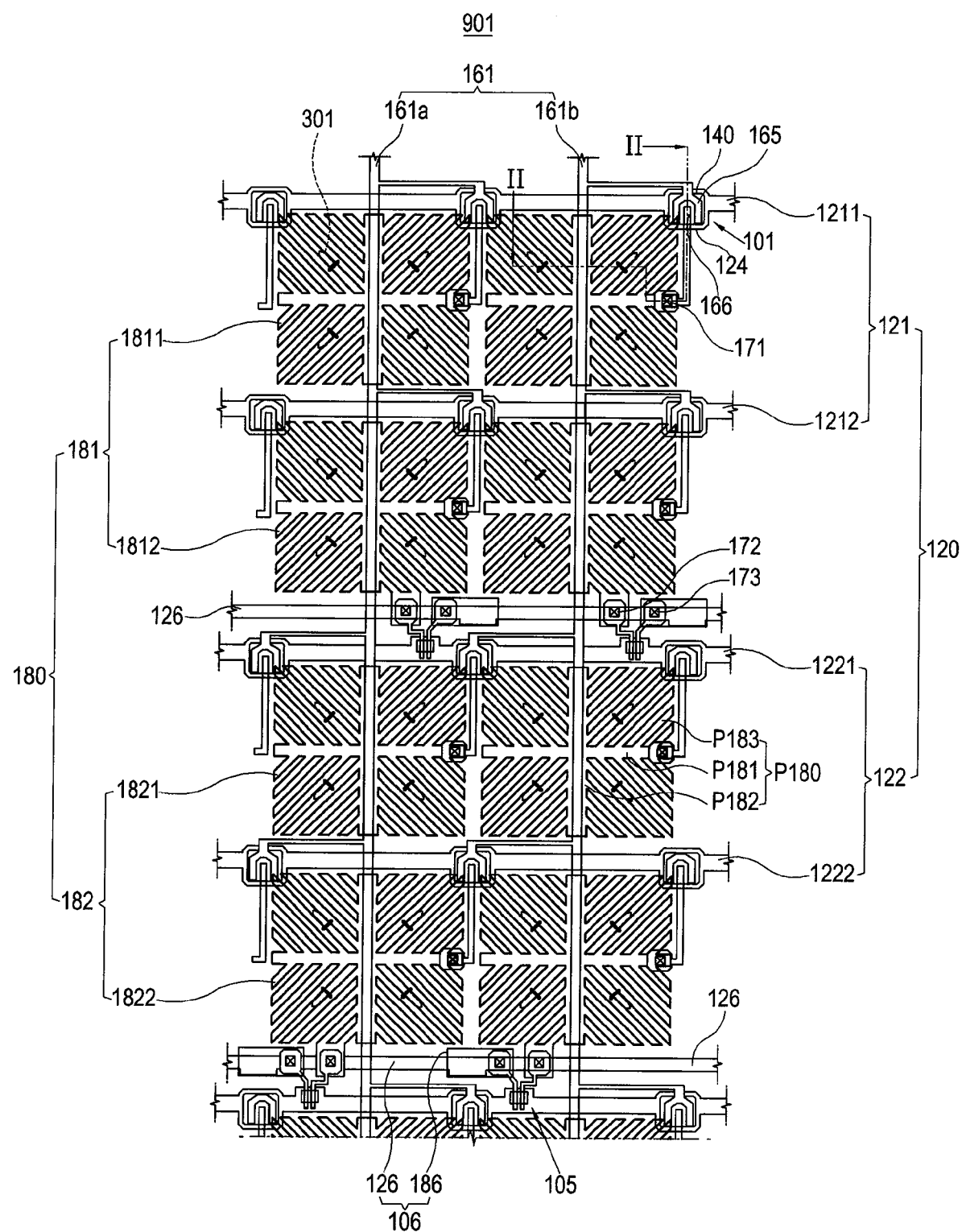
FIG. 1 is a layout of a display device according to a first exemplary embodiment of the present invention.
Figure 2:
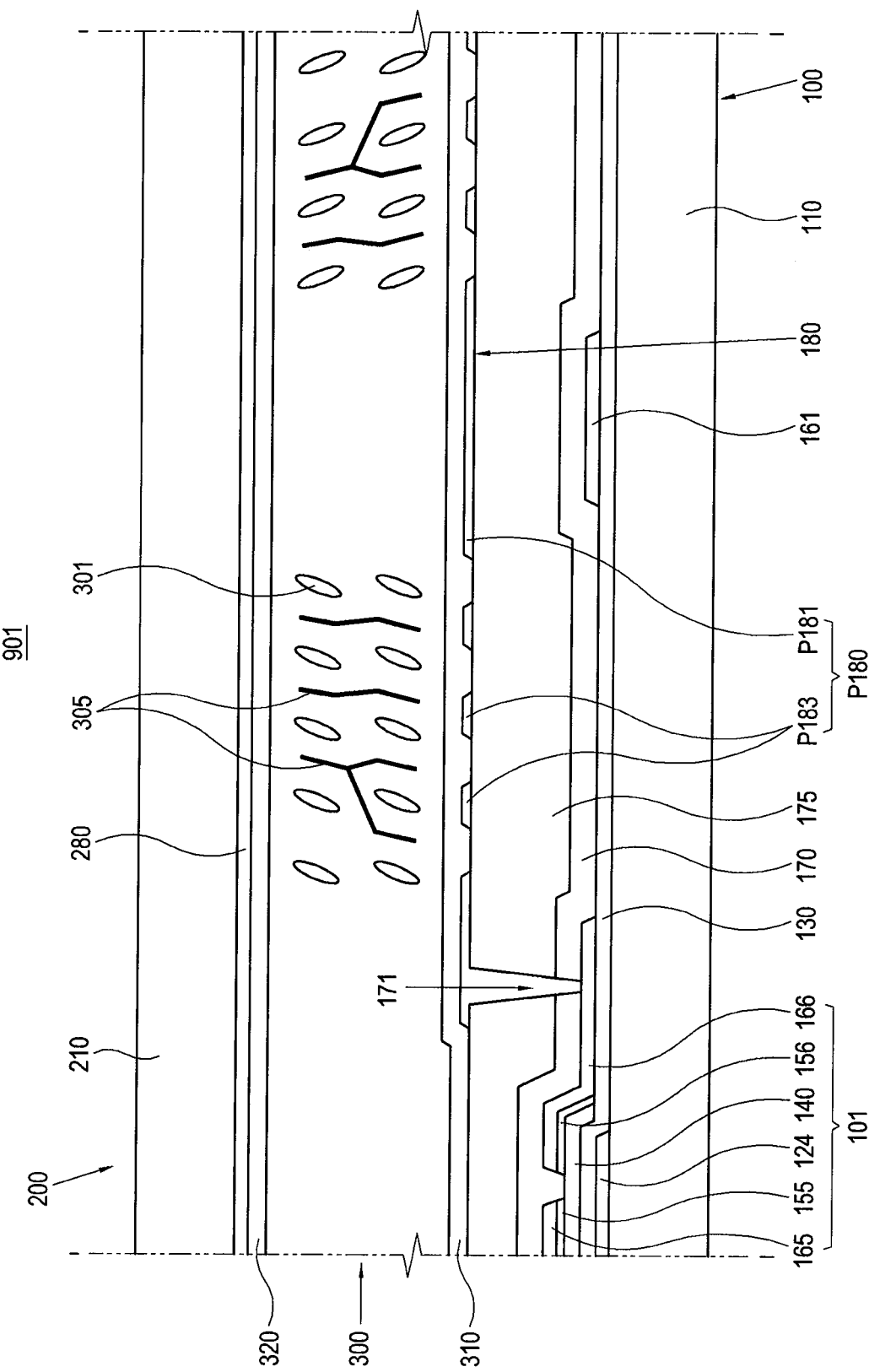
FIG. 2 is a cross sectional view cut along II-II of FIG. 1.

A first exemplary embodiment is described with referring to FIG. 1 and FIG. 2. FIG. 1 is a layout of a display device 901 according to the first exemplary embodiment of the present invention. FIG. 2 is a cross sectional view cut along II-II of FIG. 1.

As shown in FIG. 1 and FIG. 2, the display device 901 includes a first display substrate 100, a second display substrate 200, and a liquid crystal layer 300. Further, a first orientation film 310 disposed between the first display substrate 100 and the liquid crystal layer 300, and a second orientation film 320 disposed between the second display panel 200 and the liquid crystal layer 300 are included. Here, the liquid crystal layer 300 includes vertically aligned (VA) type liquid crystal molecules 301.

The first display substrate 100 includes a first substrate member 110, a plurality of pixel electrodes 180 formed on the first substrate member 110, a plurality of data lines 161, a plurality of gate lines 120 and a plurality of driving thin film transistors (TFT) 101. Also, the first display substrate 100 further includes a color filter 175.

The second display substrate 200 includes a second substrate member 210, and a common electrode 280 formed on the second substrate member 210. Here, the common electrode 280 is formed on a surface of the second substrate member 210 facing opposite to the pixel electrode 180.

The pixel electrode 180 includes a micro-slit pattern P180. The micro-slit pattern P180 divides a pixel region disposed of the pixel electrode 180 into a plurality of domains.

The micro-slit pattern P180 includes at least one vertical part P181, at least one transverse part P182 crossing the vertical part P181 and a plurality of slant parts P183 extended from the vertical part P181 and the transverse part P182. Though one vertical part P181 and one transverse part P182 are represented in FIG. 1, the present invention is not limited to this. Accordingly, the micro-slit pattern P180 may include a plurality of vertical parts P181 and the transverse parts P182.

Each slant part P183 has width equal to or less than 6 μm. The slant part P183 is disposed to be separated from its adjacent slant part P183 with an interval equal to or less than 6 μm. The lesser the width of the slant part P183 and the interval between the slant parts P183, the better it is, and most preferably, if less than 3 μm respectively. The width of the vertical part P181, the transverse part P182 and the slant part P183, and the interval between the slant parts P183 are properly formed with the consideration of light transmittance and a response characteristic of the liquid crystal molecules 301.

Also, in FIG. 1, the plural slant parts P183 are formed with the constant width identical with each other. However, the present invention is not limited to this. Accordingly, the plural slant parts P183 may have the width variously different from each other. Also, the one slant part P183 may gradually vary its width. That is, the slant part P183 may have its width larger or smaller as the slant part P183 moves farther from the transverse part P182 or the vertical part P181.

The pixel electrode 180 formed by the micro-slit pattern P180 can effectively pre-tilt the liquid crystal molecules 301 in the liquid crystal layer 300 through using fringe field produced in the slant part P183. Accordingly, the pixel electrode 180 having the micro-slit pattern P180 divides the pixel region into plural domains and as well as pre-tilts the liquid crystal molecules 301 of the liquid crystal layer 300 in the domain with directions different from other domains. A pre-tilt refers to an inclination of the liquid crystal molecules 301 in the liquid crystal layer 300 by a predetermined angle from a vertically oriented state direction. A pre-tilt direction refers to a pre-tilting direction or inclining direction along which the liquid crystal molecules 301 is pre-tilted from the surface of the orientation films 310 and 320. A head part of the liquid crystal molecules 301 represented in black in FIG. 1 indicates the pre-tilt direction of the liquid crystal molecules 301. Accordingly, the display device 901 can have an enhanced view angle.

The plural data lines 161 cross center portion of the plural pixel electrodes 180 and arrange parallel with each other. The plural gate lines 120 cross the data lines 161. Each of the plural driving thin film transistors 101 is connected with one data line 161, one gate line 120, and one pixel electrode 180.

The data line 161a alternately supply data voltage to the pixel electrodes 180 under which the data line 161a crosses and the pixel electrodes 180 under which the adjacent data line 161b crosses. That is, (referring to FIG. 1), the data line 161a supplies the data voltage to the pixel electrode 180 formed thereon in the first row, supplies the data voltage to the pixel electrode 180 formed on the adjacent data line 161b in the second row and supplies the data voltage to the pixel electrode 180 formed thereon in the third row.

Specifically, the driving thin film transistor 101 is disposed between the data lines 161 at an edge portion of the pixel electrode 180 and one data line 161a is alternately connected with the driving thin film transistors 101 positioned along the longitudinal direction of the data line 161 at the two opposite sides from the data line 161. Each of the driving thin film transistors 101 is positioned at the same relative position with respect to the corresponding pixel electrode 180. Specifically, the driving thin film transistor 101 is positioned at the top right corner of its corresponding pixel electrode 180. However, the present invention is not limited to this. Accordingly, one data line 161a may be connected with the driving thin film transistors 101 positioned at one adjacent side of the data line 161a, and the driving thin film transistors 101 may be alternately connected with the pixel electrodes positioned at the both opposite sides of the data line 161 along the data line 161 longitudinal direction. In this case, one data line 161a may also supply the data voltage to the pixel electrode 180 crossed by the data line 161a and the pixel electrode crossed by the adjacent data line 161b alternately along the longitudinal direction of the data line 161.

The pixel electrode 180 includes a first pixel electrode 181 supplied with the data voltage from the data line 161 disposed thereunder and a second pixel electrode 182 not supplied with the data voltage from the data line 161 disposed thereunder. The second pixel electrode 182 is adjacent to the first pixel electrode 181 in the data line 161 longitudinal direction and is supplied with the data voltage from the data line 161b adjacent to the data line 161a.

According to the above described configuration, the pixel electrode 180 connected to the data line 161a is supplied with the data voltage of identical polarity and the pixel electrode 180 can receive the data voltage of polarity different from the adjacent pixel electrode 180. Accordingly, the display device 901 with a column reverse driving way can have same effect that can be obtained from the dot reverse driving. In other words, though the reversed data voltage is per data line 161, each pixel electrode 180 has the data voltage of different polarity not only along the data line 161 transverse direction but also along the data line 161 longitudinal direction.

Accordingly, a driving at 120 Hz or over is possible without difficulty since the display device 901 is driven by the column reverse driving way. Meanwhile, phenomena of cross talk that can be produced by adopting the column reverse driving way can be effectively suppressed.

Also, an aperture ratio of the display device 901 can be increased since the data line 161 is disposed at the center portion of the pixel electrode 180. The data line 161 disposed to substantially correspond with a boundary between the domains. Accordingly, the influence of the data line 161 disposed at the center portion of the pixel electrode 180 on the light transmittance is insignificant because the boundary between the domains is generally forms a dark part. Meanwhile, for the data line 161 not positioning at the edge part of the pixel electrode 180, a size of the pixel electrode 180 can be magnified. Accordingly, the aperture ratio can be effectively increased.

Also, the data line 161 is overlapped with the pixel electrode 180 by a constant area size even if there is an alignment error since the data line 161 is disposed at the center portion of the pixel electrode 180. In the contrary, if the data line 161 positioned at the edge portion of the pixel electrode 180, the area overlapped by the pixel electrode 180 and the data line 161 varies according to the align error, which is a cause of inferiority in the product image quality. Accordingly, if the data line 161 is positioned at the center portion of the pixel electrode 180, the image quality of the display device 901 can be enhanced.

The first pixel electrode 181 includes a first major pixel electrode 1811 and a first minor pixel electrode 1812, and the second pixel electrode 182 includes a second major pixel electrode 1821 and a second minor pixel electrode 1822.

Also, the plural gate lines 120 include a first gate line 121 and a second gate line 122. The first gate line 121 includes a first major gate line 1211 supplying a gate signal to the driving thin film transistor 101 connected to the first major pixel electrode 1811 and, a first minor gate line 1212 supplying a gate signal to the driving thin film transistor 101 connected to the first minor pixel electrode 1812. The second gate line 122 includes a second major gate line 1221 supplying a gate signal to the driving thin film transistor 101 connected to the second major pixel electrode 1821 and, a second minor gate line 1222 supplying a gate signal to the driving thin film transistor 101 connected to the second minor pixel electrode 1822.

The first major gate line 1211 and the first minor gate line 1212 supply the gate signal identical with each other. That is, the first major gate line 1211 and the first minor gate line are substantially the identical gate line. The second major gate line 1221 and the second minor gate line 1222 supply the gate line substantially identical to each other. That is, the second major gate line 1221 and the second minor gate line 1222 are substantially the identical gate line.

Also, the first display substrate 100 further includes a storage electrode line 126 formed parallel with the gate line 120, a storage electrode pad 186 formed on the storage electrode line 126, and a charging thin film transistor 105 connected to the second major gate line 1221, the first minor pixel electrode 1812 and the storage electrode pad 186. Here, the storage electrode line 126 and the storage electrode pad 186 forms a capacitor 106.

According to the configuration described above, though the first major pixel electrode 1811 and the first minor pixel electrode 1812 are respectively supplied with the identical data voltage from the identical data line 161a, the first major pixel electrode 1811 and the first minor pixel electrode 1812 have the final data voltage different from each other. That is, the first major pixel 1811 has relatively high data voltage and the first minor pixel electrode 1812 has relatively low data voltage. Accordingly, the light transmitting the first major pixel electrode 1811 and the light transmitting the first minor pixel electrode 1812 have brightness different from each other.

Such operation is also applied to the second pixel electrode 182. That is, though the second major pixel electrode 1821 and the second minor pixel electrode 1822 are respectively supplied with the identical data voltage from the identical data line 161b, the second major pixel electrode 1821 and the second minor pixel electrode 1822 have the final data voltage different from each other.

Thus, the pixel region divided into the plural domains by the micro-slit pattern P180 is further subdivided by the first major pixel electrode 1811, the first minor pixel electrode 1812, the second major pixel electrode 1821, and the second minor electrode 1822 driven in the data voltage different from each other. Then, the display device 901 has the view angle enhanced further.

Hereinafter, a principle that the first major pixel electrode 1811 and the first minor pixel electrode 1812 have the final data voltage different from each other though the first major pixel electrode 1811 and the first minor pixel electrode 1812 are respectively supplied with the identical data voltage from the identical data line 161a will be specifically explained. Since the case for the second major pixel electrode 1821 and the second minor pixel electrode 1822 is identical to the case for the first major pixel electrode 1811 and the first minor pixel electrode 1812, only the case for the first major pixel electrode 1811 and the first minor pixel electrode 1812 will be explained.

If the first gate line 121, more specifically the first major gate line 1211 and the first minor gate line 1211 are supplied with the gate signal, the driving thin film transistors 101 respectively connected to these are activated. Accordingly, the identical data voltage supplied by the identical data line 161a is supplied to the first major pixel electrode 1811 and the first minor pixel electrode 1812 through the respective driving thin film transistors 101. At this time, the first major pixel electrode 1811 and the first minor pixel electrode 1812 have the identical data voltage and the identical light transmittance, thus showing substantially the identical brightness.

Then, if the second gate line 122, more specifically the second major gate line 1221 and the second minor gate line 1222 are supplied with the gate signal, the driving thin film transistors 101 and the charging thin film transistor 105 respectively connected to these are activated. The charging thin film transistor 105 is connected to the first minor pixel electrode 1812 and the storage electrode pad 186 of the capacitor 106. Accordingly, the data voltage of the first minor pixel electrode 1812 flows to the capacitor 106 through the charging thin film transistor 105. Accordingly, the first minor pixel electrode 1812 has the final data voltage lower than the first minor pixel electrode 1812.

According to this principle, though the first major pixel electrode 1811 and the first minor pixel electrode 1812 are respectively supplied with the identical data voltage from the data line 161a, they will have the final voltage minutely different from each other.

Referring to FIG. 2, a structure of the display device 901 will be specifically described. FIG. 2 illustrates the driving thin film transistor 101 and the first major pixel electrode 1811.

Hereinafter the thin film transistor 101 refers to the actual driving thin film transistor and the pixel electrode refers to the first major pixel electrode. Also, a description of a structure of the thin film transistor 101 can be applied identically to the charging thin film transistor 106 and a description about the pixel electrode 180 can be applied to the first major pixel electrode as well as the rest pixel electrodes.

First, a structure of the first display substrate 100 is described.

The first substrate member 110 is transparently formed of materials including glass, quartz, ceramics, plastic and so on.

The plurality of the gate lines 120, a plurality of gate electrodes 124 branched from the gate line 120 and the storage electrode line 126 are formed on the first substrate member 110.

A gate wiring 120, 124 and 126 is formed with metal like Al, Ag, Cr, Ti, Ta, Mo, etc. or alloy of these metals. Though the gate wiring 120, 124 and 126 is shown as monolayer in FIG. 2, the gate wiring 120, 124 and 126 may be formed as multilayer including a metal layer of excellent physical and chemical property which are Cr, Mo, Ti, Ta, or alloy of these metals, and a metal layer of small specific electrical resistance which are Al group and Ag group metals. Besides, the gate wiring 120, 124 and 126 may be formed with various metals or conductors and preferred to be patterned with a common etching condition.

A gate insulating layer 130 made of SiNx or the like is formed on the gate wiring 121 and 124.

A data wiring is formed on the gate insulating layer 130 including a plurality of data lines 161 crossing the gate line 120, a plurality of source electrodes 165 branched from the data line 161 and a plurality of drain electrodes 166 separately disposed from the source electrodes 165.

The data wiring 161, 165, and 166, like the gate wiring 120, 124 and 126, is formed with conducting materials like Cr, Mo, Al, etc. or alloy of these metals, and may be formed as monolayer or multi layer.

A semiconductor layer 140 is formed on a region between the gate insulating layer 130 above the gate electrode 124, and the source electrode 165 and the drain electrode 166. Specifically, at least a part of the semiconductor layer 140 is overlapped with the gate electrode 124, the source electrode 165 and the drain electrode 165. Then, the three electrodes of the thin film transistor 101 are configured with the gate electrode 124, the source electrode 165 and the drain electrode 166. A channel region of the thin film transistor 101 is formed at the semiconductor layer 140 between the source electrode 165 and the drain electrode 166.

Also, ohmic contact members 155 and 156 are formed between the semiconductor layer 140 and the source electrode 165, and between the semiconductor layer 140 and the drain electrode 166 to reduce the contact resistance. The ohmic contact members 155 and 156 are made of silicide, amorphous silicon highly doped with n-type impurities, and the like.

A passivation layer 170 of low dielectric insulator like a-Si:C:O, a-Si:O:F, etc. or inorganic insulator like silicon nitride, silicon oxide, etc. is formed on the data wiring 161, 165, and 166 by plasma enhanced chemical vapor deposition (PECVD).

The color filters 175 having the primary three colors are respectively disposed on the passivation layer 170 in sequential order. At this time, the color of the color filters 175 are not limited to the primary three colors but may be configured variously of colors more than one. The color filter 175 assigns a color to the light transmitting the display device 901.

Further, though the color filter 175 is formed on the passivation layer 170, the present invention is not limited to this. Accordingly, the color filter 175 may be formed between the passivation layer 170 and the data wiring 161, 165 and 166. The color filter 175 also may be formed in the second display substrate 200 not in the first display substrate 100.

The plurality of the pixel electrodes 180 is formed on the color filter 175. The pixel electrode 180 is made of transparent conductive material like indium tin oxide (ITO), indium zinc oxide (IZO), etc.

Also, a plurality of contact holes 171 exposing a portion of the drain electrode 166 is formed in the passivation layer 170 and the color filter 175. The pixel electrode 180 and the drain electrode 166 are electrically connected through the contact holes 171. Also, as shown in FIG. 1 and FIG. 2, the passivation layer 170 and/or the color filter 175 are further formed with contact holes 172 to respectively connect a source electrode of the charging thin film transistor 105 with the first minor pixel electrode 1812 and with the second minor pixel electrode 1822, and a contact hole 173 to connect a drain electrode of the charging thin film transistor 105 with the storage electrode pad 186 of the capacitor 106.

The pixel electrode 180 includes the micro-slit pattern P180. Though the micro-slit pattern P180 is formed in the pixel electrode 180, the present invention is not limited to this. Accordingly, the micro-slit pattern P180 may be formed on the common electrode 280 in the second display substrate 200. However, forming the micro-slit pattern P180 in the pixel electrode 180 is advantageous for a simplification of the manufacturing process.

Also, an insulator having low dielectric constant and more than 1 μm thickness is disposed between the pixel electrode 180 and the data wiring 161, 165 and 166. The insulator may include the color filter 175, the passivation layer 170 and so on.

Next, a structure of the second display substrate 200 will be described.

The second substrate member 210 like the first substrate member 110 is transparently formed of materials including glass, quartz, ceramics, plastic materials and so on.

The common electrode 280 that form an electric field with the pixel electrode 180 is formed on the second substrate member 210. The common electrode 280 is also formed of the transparent materials like ITO or IZO. The common electrode 280 may be formed without undergoing a process of forming any pattern. Accordingly, the whole manufacturing process for the display device 901 may be simplified.

Also, though not illustrated, the second display substrate 200 may further include a light blocking member.

Also, the first display substrate 100 and the second display substrate 200 are not limited to the structures described above. Accordingly, the first display substrate 100 and the second display substrate 200 may have known various structures besides the structure illustrated in FIG. 1 and FIG. 2.

The first orientation film 310 is disposed on the pixel electrode 180 and the second orientation film 230 is disposed on the common electrode 280. Specifically, the liquid crystal layer 300 is disposed between the first orientation film 310 and the second orientation film 320. The liquid crystal molecules 301 in the liquid crystal layer 300 are vertically oriented by the first orientation film 310 and the second orientation film 320.

The liquid crystal layer 300 includes the plurality of vertical orientation type liquid crystal molecules 301 and ultra violet ray (UV) cured type monomers 305. The pixel electrode 180 in the form of the micro-slit pattern P180 and the UV cured type monomers 305 pre-tilts the vertically oriented liquid crystal molecules 301 in a direction different from each other for each domain. At this time, the vertically oriented liquid crystal molecules are pre-tilted by an angle within a range between 0.1 degree and 3 degree.

All or any one of the micro-slit pattern P180 and the UV cured type monomers 305 may be used as a method for pre-tilting the liquid crystal molecules 301 in the liquid crystal layer 300.

Figure 3:
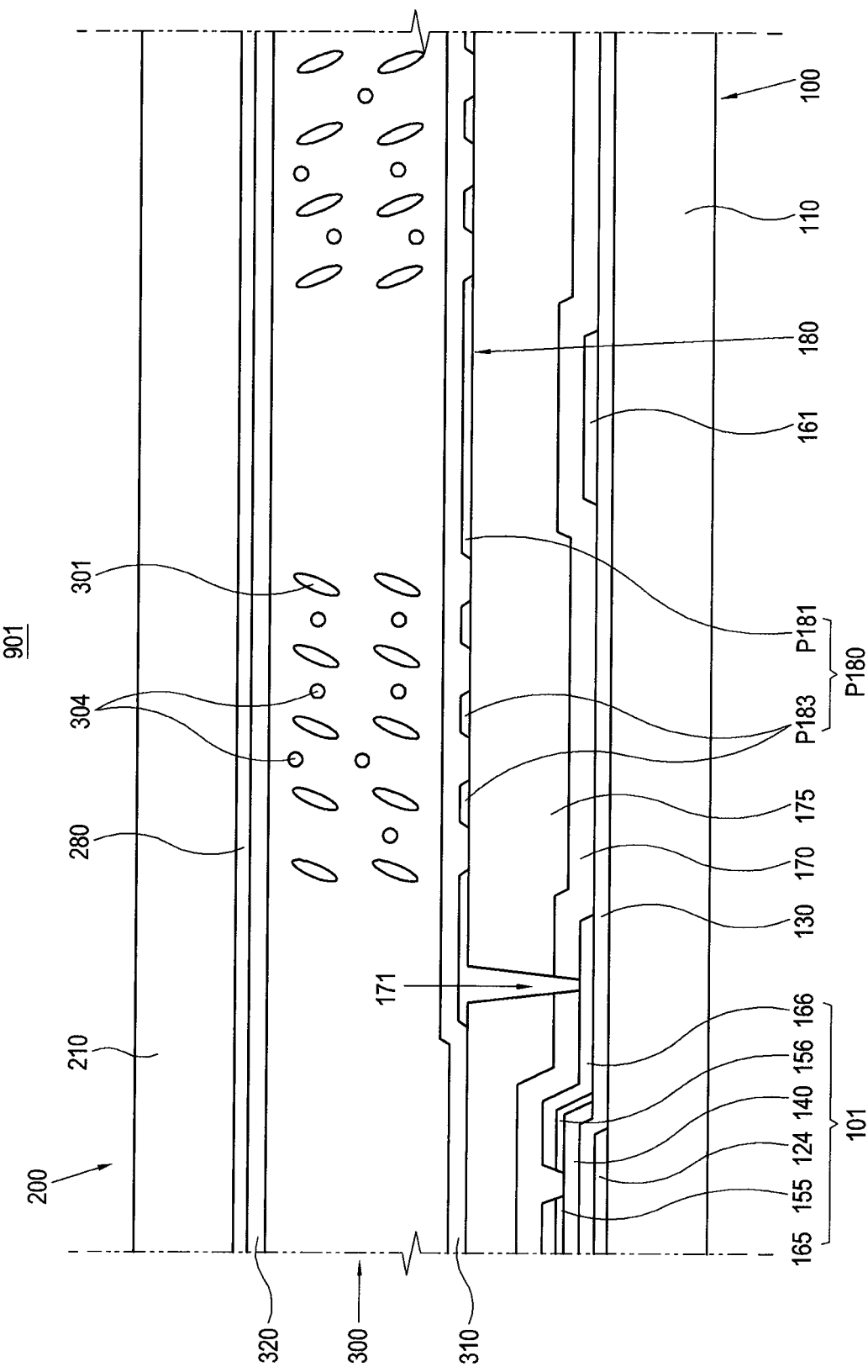
FIG. 3 is a cross sectional view illustrating a manufacturing process of the display device in FIG. 1.

A method to pre-tilt the vertically oriented liquid crystal molecules 301 using the UV cured type monomers 305 (shown in FIG. 2) will be specifically explained referring to FIG. 3. The liquid crystal layer 300 including intermediate UV cured type monomers 304 before cured and the vertically oriented liquid crystal molecules 301 disposed between the first display substrate 100 and the second display substrate 200. Then, after lying down the liquid crystal molecules 301 by building the electric field between the first display substrate 100 and the second display substrate 200, irradiate UV to the liquid crystal layer 300. The irradiated intermediate UV cured type monomers 304 are cured and the UV cured type monomers 305 pre-tilt the liquid crystal molecules 301 as shown in FIG. 2.

According to this configuration, the image quality of the display device 901 according to the first exemplary embodiment can be enhanced.

Second Exemplary Embodiment

A second exemplary embodiment of the present invention will be described with referring to FIG. 4 and FIG. 5.

Figure 4:
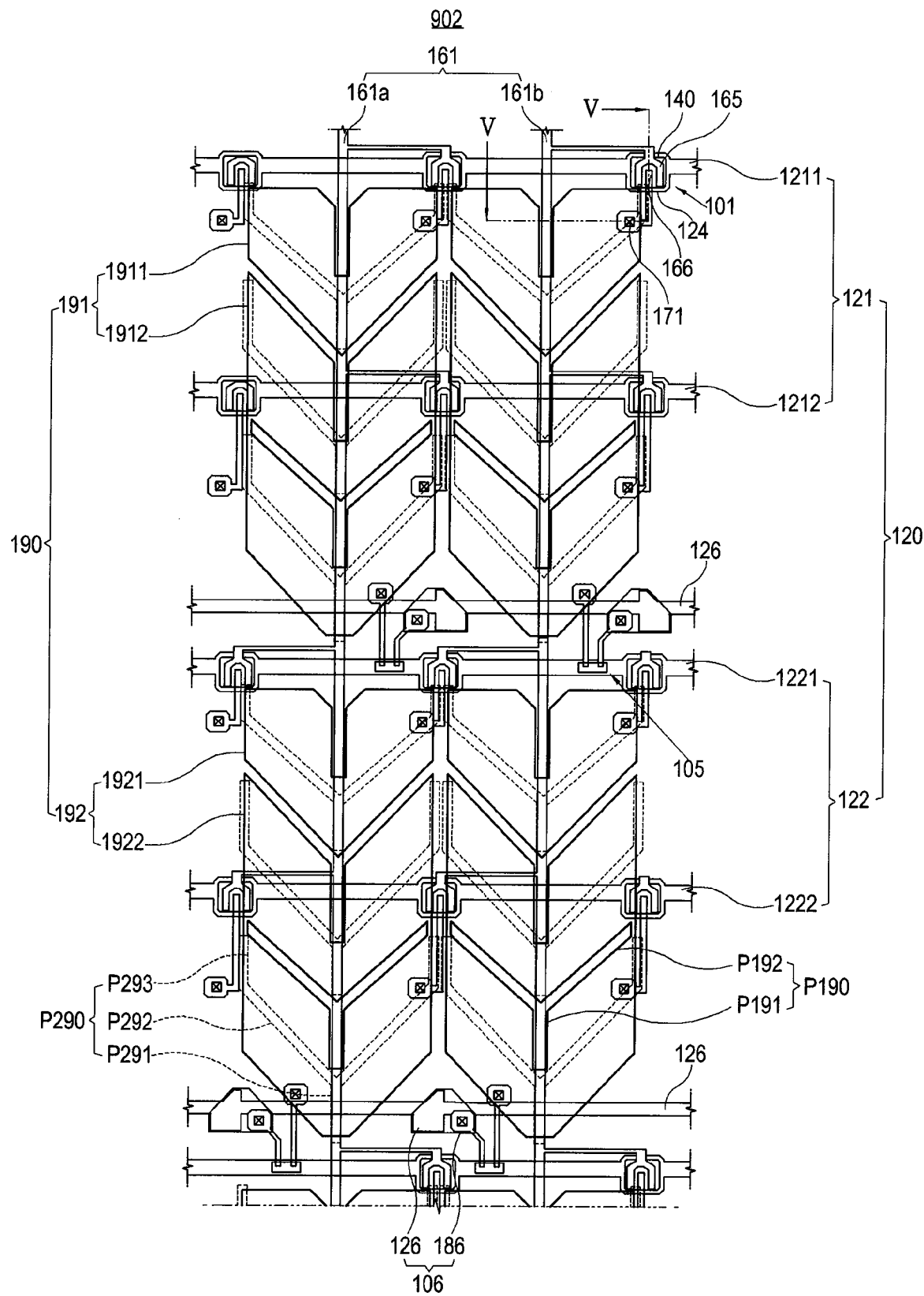
FIG. 4 is a layout of a display device according to a second exemplary embodiment of the present invention.

FIG. 4 is a layout of a display device 902 according to the second exemplary embodiment of the present invention. FIG. 5 is a cross sectional view cut along V-V of FIG. 4

Figure 5:
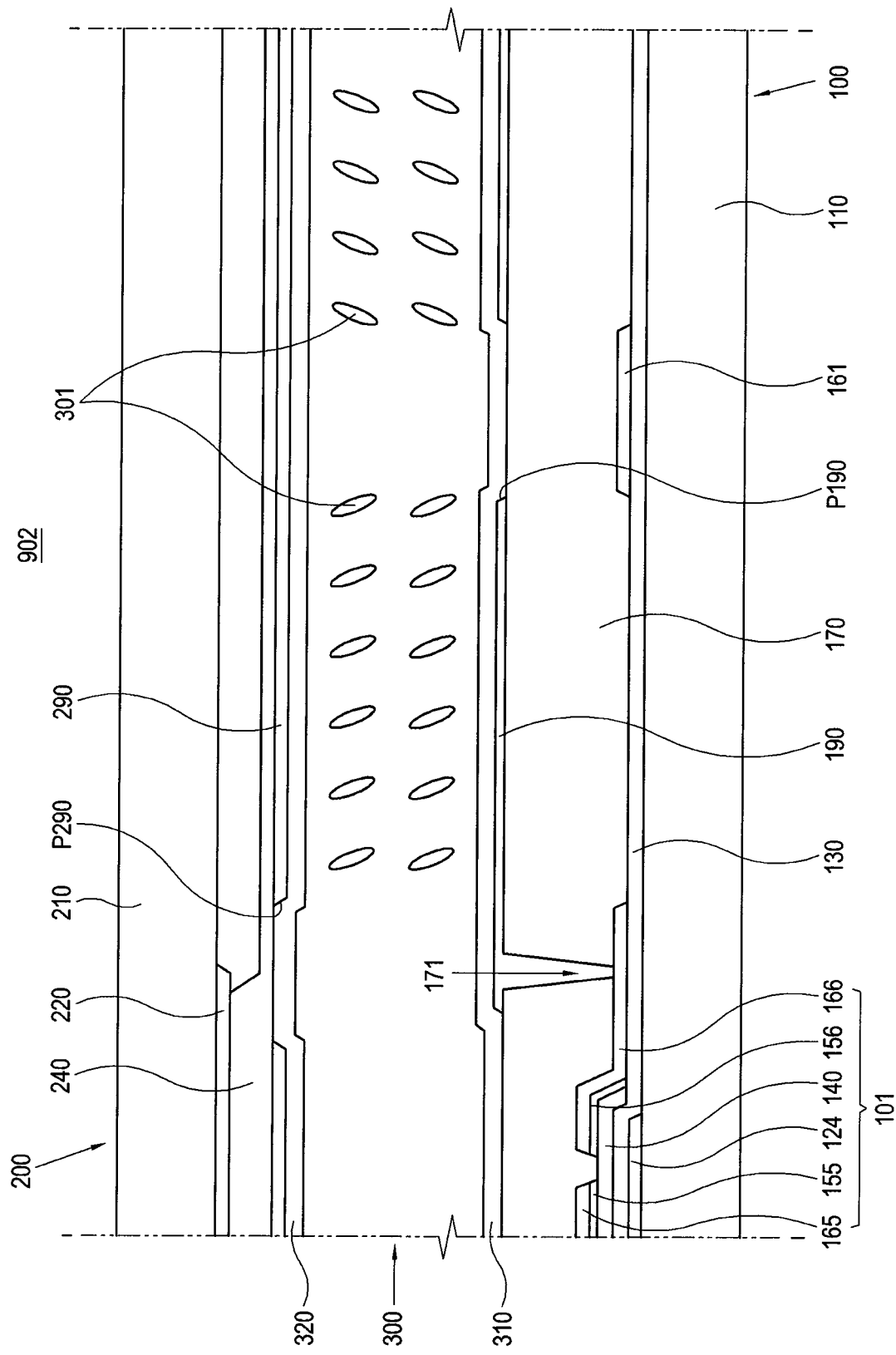
FIG. 5 is a cross sectional view cut along V-V of FIG. 4.

As shown in FIG. 4 and FIG. 5, the display device 902 includes a first display substrate 100, a second display substrate 200 and a liquid crystal layer 300. Further, a first orientation film 310 disposed between the first display substrate 100 and the liquid crystal layer 300, and a second orientation film 320 disposed between the second display panel 200 and the liquid crystal layer 300 are included.

The first display substrate 100 includes a first substrate member 110, a plurality of pixel electrodes 190 formed on the first substrate member 110, a plurality of data lines 161, a plurality of gate lines 120 and a plurality of driving thin film transistors (TFT) 101.

The second display substrate 200 includes a second substrate member 210, a light blocking member 220 formed on the second substrate member 210, a color filter 230, an overcoat layer 240 and a common electrode 290 formed on the second substrate member 210. Here, the light blocking member 220, the color filter 230 and the common electrode 290 are formed on a surface of the second substrate member 210 facing opposite to a pixel electrode 190.

The pixel electrode 190 and the common electrode 290 include cut patterns P190 and P290. The cut patterns P190 and P290 divides a pixel region disposed by the pixel electrode 190 into plural domains and pre-tilt the liquid crystal molecules 301 in a direction predetermined for each domain. Generally, a pre-tilt direction of the liquid crystal molecules 301 is a direction crossing a longitudinal direction of the cut pattern P190 and P290.

Also, though all of the pixel electrode 190 and the common electrode 290 are formed with the cut patterns P190 and P290 in FIG. 4, the present invention is not limited to this. Accordingly, any one of the pixel electrode 190 or the common electrode 290 may be formed with the cut pattern P190 or P290. Also, the pixel electrode 190 and the common electrode 290 may include a protrusion (not shown) instead of the cut patterns P190 and P290. The protrusion performs a same role that the cut patterns P190 and P290 perform. Also, the display device 902 may include all of the cut patterns P190, P290 and the protrusion.

The cut pattern P190 and P290 include first cut patterns P191 and P291, and second cut patterns P192 and P292 extended from the first cut patterns P191 and P291 in a slant direction of them. Also, the common electrode 290 may further include a third cut pattern P293 corresponding to an edge portion of the pixel electrode 190. The third cut pattern P293 may be omitted.

The display device 902 may have the enhanced view angle according to the configuration described above.

The plural data lines 161 cross center portion of the plural pixel electrodes 190 and are arranged parallel with each other. The plural gate lines 120 cross the data lines 161. Each of the plural driving thin film transistors 101 is connected with one data line 161, one gate line 120 and one pixel electrode 190.

The data line 161a alternately supply data voltage to the pixel electrodes 190 under which the data line 161a crosses and the pixel electrodes 190 under which the adjacent data line 161b crosses. That is, (referring to FIG. 4), the data line 161a supplies the data voltage to the pixel electrode 190 formed thereon in the first row, supplies the data voltage to the pixel electrode 190 formed on the adjacent data line 161b in the second row and supplies the data voltage to the pixel electrode 190 formed thereon in the third row.

The pixel electrode 190 includes a first pixel electrode 191 supplied with the data voltage from the data line 161 disposed thereunder and a second pixel electrode 192 not supplied with the data voltage from the data line 161 disposed thereunder. The second pixel electrode 192 is adjacent to the first pixel electrode 181 in the data line 161 longitudinal direction and is supplied with the data voltage from the data line 161b adjacent to the data line 161a.

According to the above described configuration, the pixel electrode 190 connected to the data line 161a is supplied with the data voltage of identical polarity and the pixel electrode 190 can receive the data voltage of polarity different from the adjacent pixel electrode 190. Accordingly, the display device 902 with a column reverse driving way can have same effect that can be obtained from the dot reverse driving. In other words, though the reversed data voltage is per data line 161, each pixel electrode 190 has the data voltage of different polarity not only along the data line 161 transverse direction but also along the data line 161 longitudinal direction.

Accordingly, a driving at 120 Hz or over is possible without difficulty since the display device 902 is driven by the column reverse driving way. Meanwhile, phenomena of cross talk that can be produced by adopting the column reverse driving way can be effectively suppressed.

Also, an aperture ratio of the display device 902 can be increased since the data line 161 is disposed at the center portion of the pixel electrode 190. The data line 161 disposed to substantially correspond with a boundary between the domains. Accordingly, the influence of the data line 161 disposed at the center portion of the pixel electrode 190 on the light transmittance is insignificant because the boundary between the domains is generally forms a dark part. Meanwhile, for the data line 161 not positioning at the edge part of the pixel electrode 190, a size of the pixel electrode 190 can be magnified. Accordingly, the aperture ratio can be effectively increased.

The first pixel electrode 191 includes a first major pixel electrode 1911 and a first minor pixel electrode 1912, and the second pixel electrode 192 includes a second major pixel electrode 1921 and a second minor pixel electrode 1922.

Also, the plural gate lines 120 include a first gate line 121 and a second gate line 122. The first gate line 121 includes a first major gate line 1211 supplying a gate signal to the driving thin film transistor 101 connected to the first major pixel electrode 1911 and, a first minor gate line 1212 supplying a gate signal to the driving thin film transistor 101 connected to the first minor pixel electrode 1912. The second gate line 122 includes a second major gate line 1221 supplying a gate signal to the driving thin film transistor 101 connected to the second major pixel electrode 1921 and, a second minor gate line 1222 supplying a gate signal to the driving thin film transistor 101 connected to the second minor pixel electrode 1922.

The first major gate line 1211 and the first minor gate line 1212 supply the gate signal identical with each other. That is, the first major gate line 1211 and the first minor gate line are substantially the identical gate line. The second major gate line 1221 and the second minor gate line 1222 supply the gate line substantially identical to each other. That is, the second major gate line 1221 and the second minor gate line 1222 are substantially the identical gate line.

Also, the first display substrate 100 further includes a storage electrode line 126 formed parallel with the gate line 120, a storage electrode pad 186 formed on the storage electrode line 126, and a charging thin film transistor 105 connected to the second major gate line 1221, the first minor pixel electrode 1812 and the storage electrode pad 186. Here, the storage electrode line 126 and the storage electrode pad 186 forms a capacitor 106.

According to the configuration described above, though the first major pixel electrode 1911 and the first minor pixel electrode 1912 are respectively supplied with the identical data voltage from the identical data line 161a, the first major pixel electrode 1911 and the first minor pixel electrode 1912 have the final data voltage different from each other. That is, the first major pixel 1911 has relatively high data voltage and the first minor pixel electrode 1912 has relatively low data voltage. Accordingly, the light transmitting the first major pixel electrode 1911 and the light transmitting the first minor pixel electrode 1912 have brightness different from each other.

Such operation is also applied to the second pixel electrode 192. That is, though the second major pixel electrode 1921 and the second minor pixel electrode 1922 are respectively supplied with the identical data voltage from the identical data line 161b, the second major pixel electrode 1921 and the second minor pixel electrode 1922 have the final data voltage different from each other.

Further, the pixel region divided into the plural domains by the cut patterns P190 and P290 is further subdivided by the first major pixel electrode 1911, the first minor pixel electrode 1912, the second major pixel electrode 1921 and the second minor electrode 1922 driven in the data voltage different from each other. Then, the display device 902 has the view angle enhanced further.

According to this configuration, the image quality of the display device 902 according to the second exemplary embodiment can be enhanced.

Third Exemplary Embodiment

Figure 6:
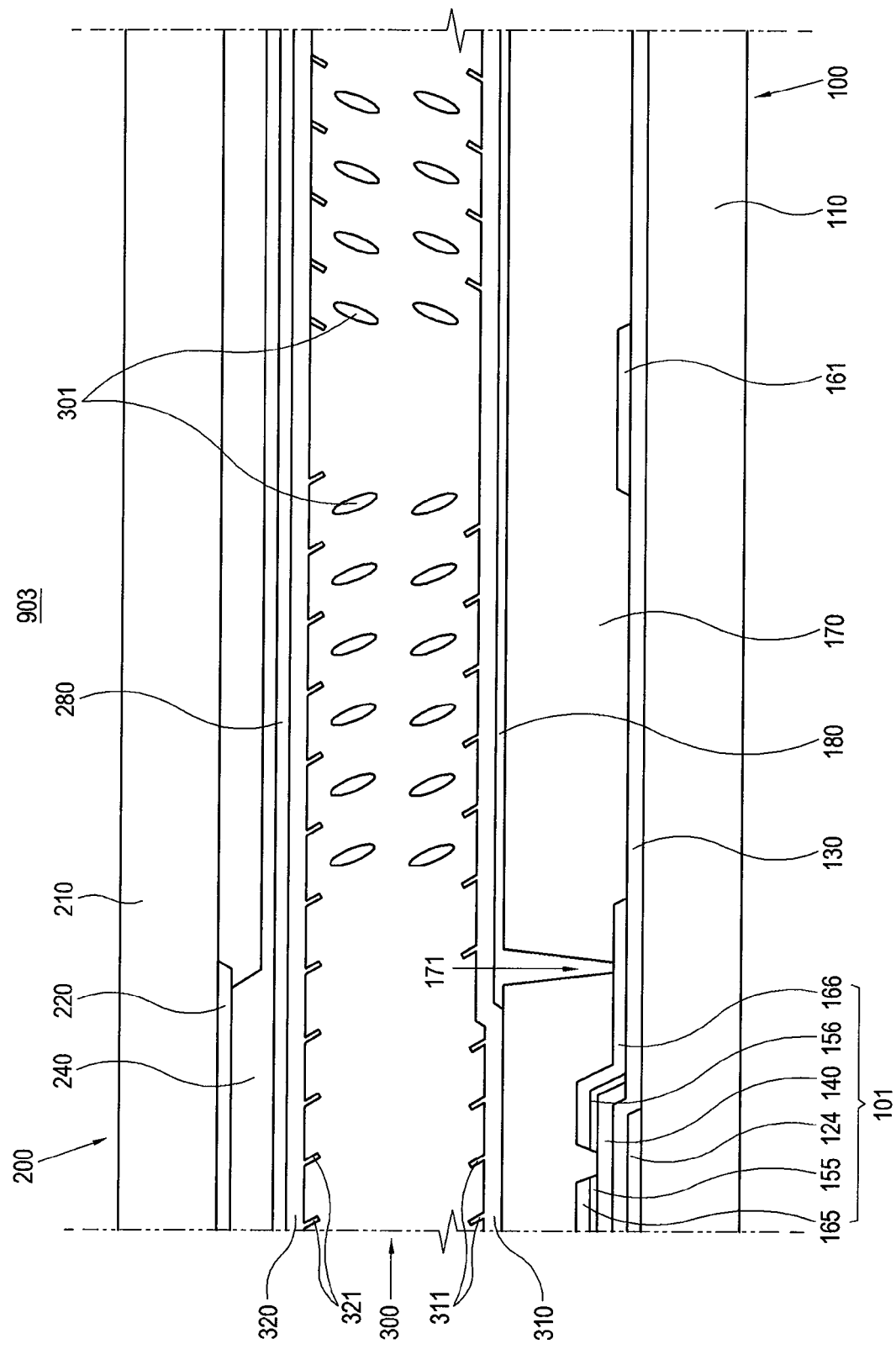
FIG. 6 is a cross sectional view of a display device according to a third exemplary embodiment of the present invention.

A third exemplary embodiment of the present invention will be described with referring to FIG. 6. FIG. 6 is a cross sectional view of a display device 903 according to the third exemplary embodiment of the present invention.

As shown in FIG. 6, the display device 903 includes a first display substrate 100, a second display substrate 200 and a liquid crystal layer 300. Further, a first orientation film 310 disposed between the first display substrate 100 and the liquid crystal layer 300, and a second orientation film 320 disposed between the second display panel 200 and the liquid crystal layer 300 are included. Here, liquid crystal molecules 301 in the liquid crystal layer 300 are vertically aligned by the first and the second orientation films 310 and 320 under a state of not applying voltage between a pixel electrode 180 and a common electrode 280.

At least one of the first orientation film 310 and the second orientation film 320 pre-tilts the liquid crystal molecules 301 oriented vertical at the orientation film surface using an inclined exposing slant light method and the like. That is, at least one of the first orientation film 310 and the second orientation film 320 have a pre-tilt 311 or a pre-tilt 321 and the vertically oriented liquid crystal molecules 301 are inclined to be pre-tilted in a pre-tilt direction. Accordingly, the liquid crystal molecules 301 are inclined at the orientation films 310 and 320 in the pre-tilt direction close to the vertical direction. FIG. 6 illustrates that all of the first orientation film 310 and the second orientation film 320 have the pre-tilts 311 and 321.

At least one of the first orientation film 310 and the second orientation film 320 divides a pixel region disposed with the pixel electrode 180 into plural domains. At least one of the first orientation films 310 and the second orientation film 320 pre-tilts the liquid crystal molecules 301 in a direction variously different from each other for each domain.

Also, although not illustrated in FIG. 6 at least one of the pixel electrode 180 and the common electrode 280 may include a micro-slit pattern or a cut pattern. In this case, the micro pattern or the cut pattern may pre-tilt the liquid crystal molecules 301 more effectively together with the first orientation film 310 and the second orientation film 320. Accordingly, the display device 903 can pre-tilt the liquid crystal molecules 301 more effectively.

The rest configuration except the first orientation film 310 and the second orientation film 320 is same as illustrated in FIG. 1 or FIG. 4.

According to this configuration, the image quality of the display device 903 according to the third exemplary embodiment can be enhanced.

Fourth Exemplary Embodiment

Figure 7:
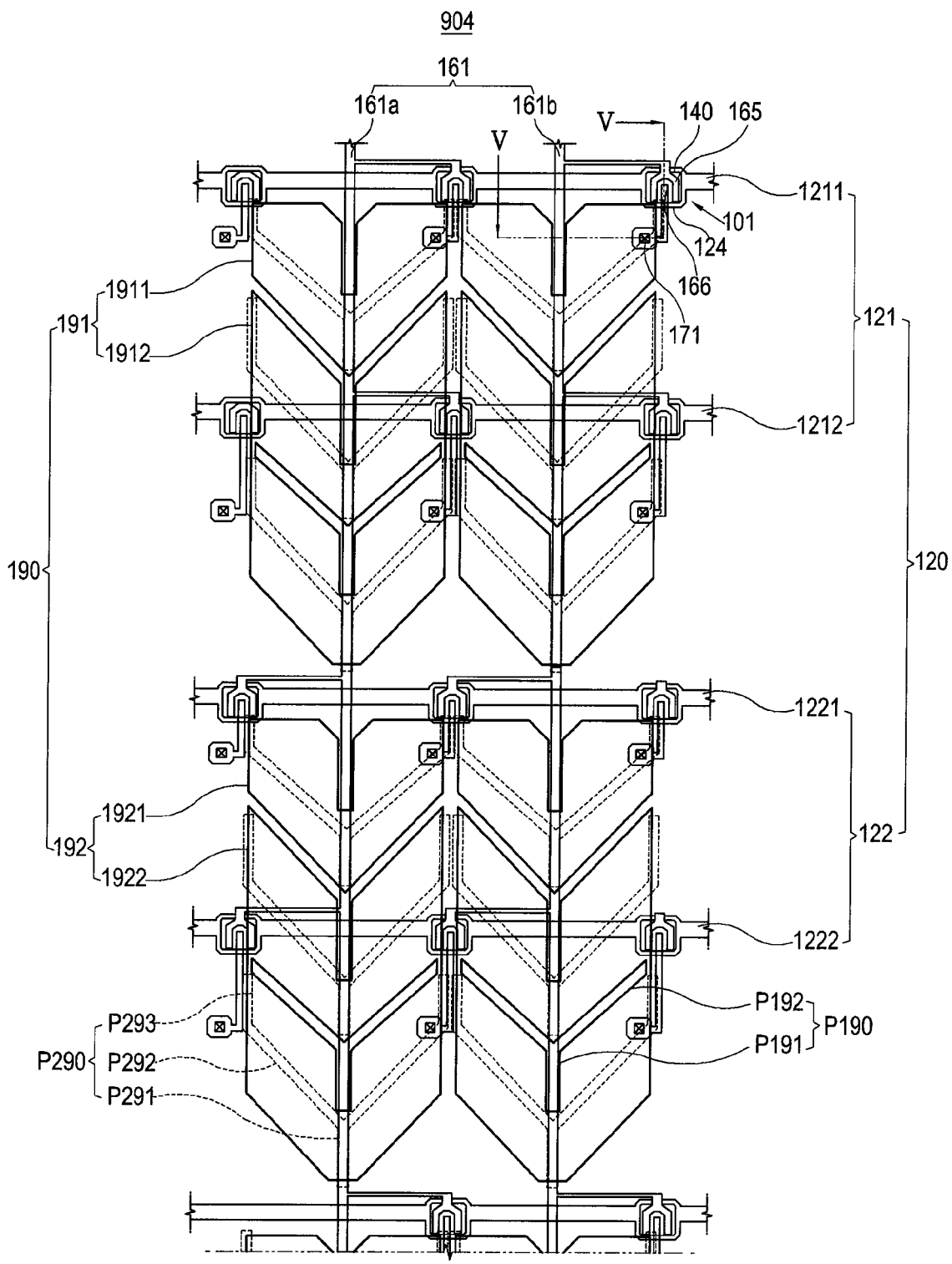
FIG. 7 is a layout of a display device according to a fourth exemplary embodiment of the present invention.

A fourth exemplary embodiment of the present invention will be described with referring to FIG. 7. FIG. 7 is a layout of a display device 904 according to the fourth exemplary embodiment of the present invention.

As illustrated in FIG. 4, the pixel electrode 190 and the common electrode 290 include cut patterns P190 and P290. The cut patterns P190 and P290 divides a pixel region disposed by the pixel electrode 190 into plural domains and pre-tilt the liquid crystal molecules 301 in a direction predetermined for each domain. Generally, a pre-tilt direction of the liquid crystal molecules 301 is a direction crossing a longitudinal direction of the cut pattern P190 and P290. However, the present invention is not limited to this and only one of the pixel electrodes 190 or the common electrode 290 may be formed with the cut pattern P190 or P290. Also, the pixel electrode 190 and the common electrode 290 may include a protrusion (not shown) instead of the cut patterns P190 and P290. The protrusion performs a same role that the cut patterns P190 and P290 perform. Also, the display device 904 may include all of the cut patterns P190, P290 and the protrusion.

The cut pattern P190 and P290 include first cut patterns P191 and P291, and second cut patterns P192 and P292 extended from the first cut patterns P191 and P291 in a slant direction of them. Also, the common electrode 290 may further include a third cut pattern P293 corresponding to an edge portion of the pixel electrode 190. The third cut pattern P193 may be omitted.

The display device 904 may have the enhanced view angle according to the configuration described above.

The data line 161a alternately supply data voltage to the pixel electrodes 190 under which the data line 161a crosses and the pixel electrodes 190 under which the adjacent data line 161b crosses. That is, the data line 161a supplies the data voltage to the pixel electrode 190 formed thereon in the first row, supplies the data voltage to the pixel electrode 190 formed on the adjacent data line 161b in the second row and supplies the data voltage to the pixel electrode 190 formed thereon in the third row.

The pixel electrode 190 includes a first pixel electrode 191 supplied with the data voltage from the data line 161 disposed thereunder and a second pixel electrode 192 not supplied with the data voltage from the data line 161 disposed thereunder. The second pixel electrode 192 is adjacent to the first pixel electrode 181 in the data line 161 longitudinal direction and is supplied with the data voltage from the data line 161b adjacent to the data line 161a.

According to the above described configuration, the pixel electrode 190 connected to the data line 161a is supplied with the data voltage of identical polarity and the pixel electrode 190 can receive the data voltage of polarity different from the adjacent pixel electrode 190. Accordingly, the display device 902 with a column reverse driving way can have same effect that can be obtained from the dot reverse driving. In other words, though the reversed data voltage is per data line 161, each pixel electrode 190 has the data voltage of different polarity not only along the data line 161 transverse direction but also along the data line 161 longitudinal direction.

Also, an aperture ratio of the display device 902 can be increased since the data line 161 is disposed at the center portion of the pixel electrode 190. The data line 161 disposed to substantially correspond with a boundary between the domains. Accordingly, the influence of the data line 161 disposed at the center portion of the pixel electrode 190 on the light transmittance is insignificant because the boundary between the domains is generally forms a dark part. Meanwhile, for the data line 161 not positioning at the edge part of the pixel electrode 190, a size of the pixel electrode 190 can be magnified. Accordingly, the aperture ratio can be effectively increased.

The first pixel electrode 191 includes a first major pixel electrode 1911 and a first minor pixel electrode 1912, and the second pixel electrode 192 includes a second major pixel electrode 1921 and a second minor pixel electrode 1922.

Also, the plural gate lines 120 include a first gate line 121 and a second gate line 122. The first gate line 121 includes a first major gate line 1211 supplying a gate signal to the driving thin film transistor 101 connected to the first major pixel electrode 1911 and, a first minor gate line 1212 supplying a gate signal to the driving thin film transistor 101 connected to the first minor pixel electrode 1912. The second gate line 122 includes a second major gate line 1221 supplying a gate signal to the driving thin film transistor 101 connected to the second major pixel electrode 1921 and, a second minor gate line 1222 supplying a gate signal to the driving thin film transistor 101 connected to the second minor pixel electrode 1922.

The first major gate line 1211 and the first minor gate line 1212 supply the gate signal different from each other. Also, the second major gate line 1221 and the first minor gate line 1222 supply the gate signal different from each other. Accordingly, the first major pixel electrode 1911 and the first minor pixel electrode 1912 have data voltage different from each other, and the second major pixel electrode 1921 and the second minor pixel electrode 1922 also have data voltage different from each other.

According to the configuration described above, the light transmitting the first major pixel electrode 1911 has brightness different from the light transmitting the first minor pixel electrode 1912. Also, the light transmitting the second major pixel electrode 1921 has brightness different from the light transmitting the second minor pixel electrode 1922.

Further, the pixel region divided into the plural domains by the cut patterns P190 and P290 is further subdivided by the first major pixel electrode 1911, the first minor pixel electrode 1912, the second major pixel electrode 1921 and the second minor electrode 1922 driven in the data voltage different from each other. Then, the display device 904 has the view angle enhanced further.

According to this configuration, the image quality of the display device 904 according to the fourth exemplary embodiment can be enhanced.

Fifth Exemplary Embodiment

Figure 8:
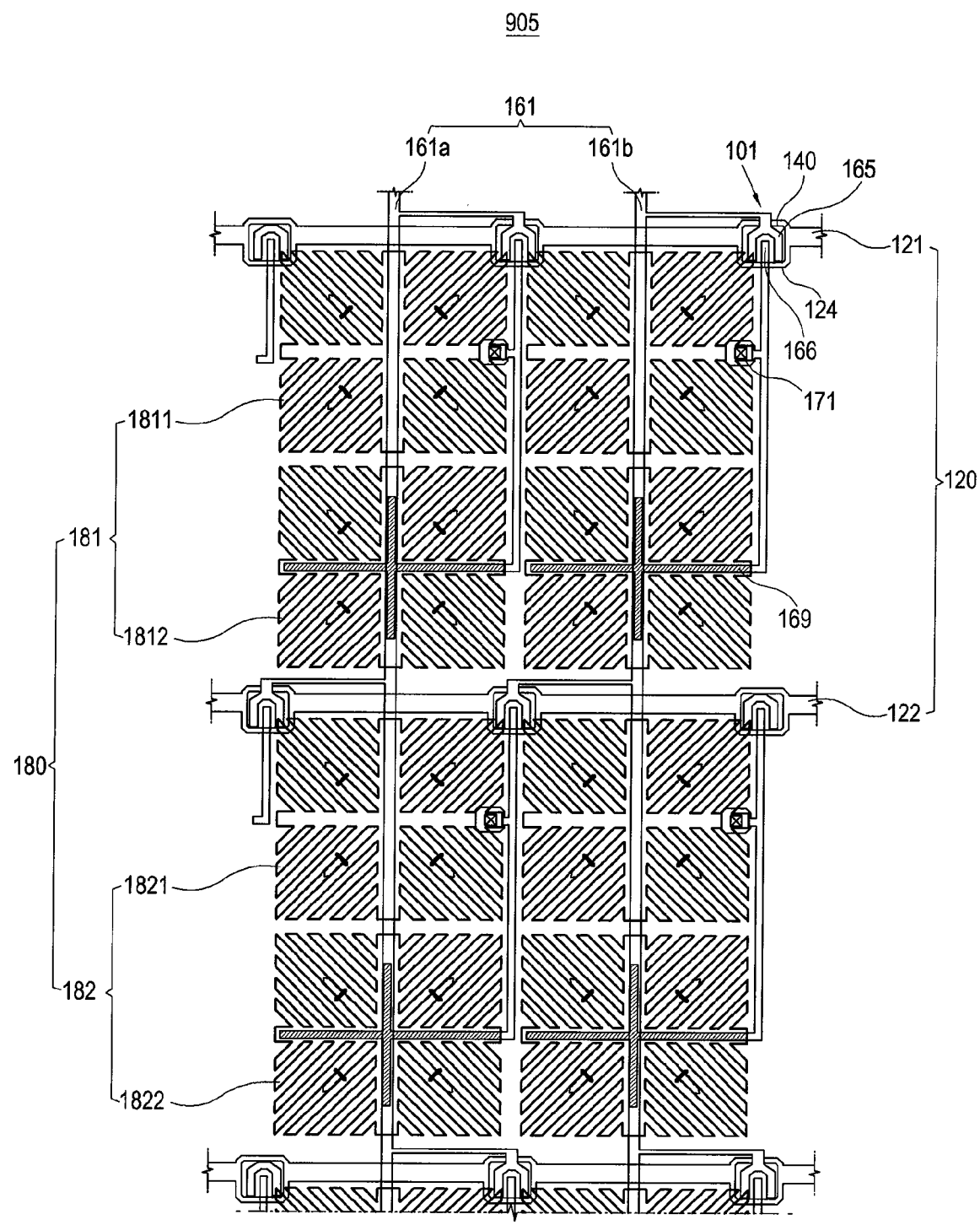
FIG. 8 is a layout of a display device according to a fifth exemplary embodiment of the present invention.

A fifth exemplary embodiment of the present invention will be described with referring to FIG. 8. FIG. 8 is a layout of a display device 905 according to the fifth exemplary embodiment of the present invention.

As shown in FIG. 8, the pixel electrode 180 includes a micro-slit pattern P180. The micro-slit pattern P180 divides a pixel region disposed of the pixel electrode 180 into a plurality of domains.

The micro-slit pattern P180 includes at least one vertical part P181, at least one transverse part P182 crossing the vertical part P181 and a plurality of slant parts P183 extended from the vertical part P181 and the transverse part P182. Though one vertical part P181 and one transverse part P182 are represented in FIG. 8, the present invention is not limited to this. Accordingly, the micro-slit pattern P180 may include a plurality of vertical parts P181 and the transverse parts P182.

As described above, the pixel electrode 180 formed by the micro-slit pattern P180 can effectively pre-tilt the liquid crystal molecules 301 in the liquid crystal layer 300 through using fringe field produced in the slant part P183. Accordingly, the pixel electrode 180 having the micro-slit pattern P180 divides the pixel region into plural domains and as well as pre-tilts the liquid crystal molecules 301 of the liquid crystal layer 300 in the domain with directions different from other domains.

Accordingly, the display device 905 can have an enhanced view angle.

The plural data lines 161 cross center portion of the plural pixel electrodes 180 and arrange parallel with each other. The plural gate lines 120 cross the data lines 161. Each of the plural driving thin film transistors 101 is connected with one data line 161, one gate line 120 and one pixel electrode 180.

The data line 161a alternately supply data voltage to the pixel electrodes 180 under which the data line 161a crosses and the pixel electrodes 180 under which the adjacent data line 161b crosses. That is, the data line 161a supplies the data voltage to the pixel electrode 180 formed thereon in the first row, supplies the data voltage to the pixel electrode 180 formed on the adjacent data line 161b in the second row and supplies the data voltage to the pixel electrode 180 formed thereon in the third row.

The pixel electrode 180 includes a first pixel electrode 181 supplied with the data voltage from the data line 161 disposed thereunder and a second pixel electrode 182 not supplied with the data voltage from the data line 161 disposed thereunder. The second pixel electrode 182 is adjacent to the first pixel electrode 181 in the data line 161 longitudinal direction and is supplied with the data voltage from the data line 161b adjacent to the data line 161a.

According to the above described configuration, the pixel electrode 180 connected to the data line 161a is supplied with the data voltage of identical polarity and the pixel electrode 180 can receive the data voltage of polarity different from the adjacent pixel electrode 180. Accordingly, the display device 905 with a column reverse driving way can have same effect that can be obtained from the dot reverse driving. In other words, though the reversed data voltage is per data line 161, each pixel electrode 180 has the data voltage of different polarity not only along the data line 161 transverse direction but also along the data line 161 longitudinal direction.

Also, an aperture ratio of the display device 905 can be increased since the data line 161 is disposed at the center portion of the pixel electrode 180. The data line 161 disposed to substantially correspond with a boundary between the domains. Accordingly, the influence of the data line 161 disposed at the center portion of the pixel electrode 180 on the light transmittance is insignificant because the boundary between the domains is generally forms a dark part. Meanwhile, for the data line 161 not positioning at the edge part of the pixel electrode 180, a size of the pixel electrode 180 can be magnified. Accordingly, the aperture ratio can be effectively increased.

The first pixel electrode 181 includes a first major pixel electrode 1811 and a first minor pixel electrode 1812, and the second pixel electrode 182 includes a second major pixel electrode 1821 and a second minor pixel electrode 1822.

Also, the plural gate lines 120 include a first gate line 121 and a second gate line 122. The driving thin film transistor 101 connected with the first gate line 121 is directly connected to the first major pixel electrode 1811 through a contact hole 171, and indirectly connected to the first minor pixel electrode 1812 through a coupling capacitance Ccp. Accordingly, the first major pixel electrode 1811 and the first minor pixel electrode 1812 are supplied with the different data voltage from each other. That is, the first major pixel electrode 1811 is supplied with the data voltage directly through the drain electrode 166 of the driving thin film transistor 101 while the first minor pixel electrode 1812 is not supplied with the data voltage directly from the drain electrode 166 of the driving thin film transistor 101 but by the coupling capacitance Ccp formed on the insulator between the first minor pixel electrode 1812 and an extension part 169 of the drain electrode 166. Accordingly, since the first minor pixel electrode 1812 is supplied with the data voltage smaller than the first major pixel electrode 1811, the light transmitting the first major pixel electrode 1811 has brightness different from the light transmitting the first minor pixel electrode 1812. At this time, the data voltage supplied to the first minor pixel electrode 1812 is 50% to 90% of the data voltage applied on the first major pixel electrode 1811.

The driving thin film transistor 101 connected with the second gate line 122 is directly connected to the second major pixel electrode 1821 through a contact hole, and indirectly connected to the second minor pixel electrode 1822 through a coupling capacitance Ccp. Accordingly, the second major pixel electrode 1821 and the second minor pixel electrode 1822 are supplied with the different data voltage from each other same as the first major pixel electrode 1811 and the first minor pixel electrode 1812.

According to the configuration described above, the pixel region divided into the plural domains by the micro-slit pattern P180 is further subdivided by the first major pixel electrode 1811, the first minor pixel electrode 1812, the second major pixel electrode 1821 and the second minor electrode 1822 driven in the data voltage different from each other. Then, the display device 905 has the view angle enhanced further.

According to this configuration, the image quality of the display device 905 according to the fifth exemplary embodiment can be enhanced.

According to the present invention, an image quality of a display device can be enhanced. Specifically, the display device has an effect that can be obtained when the display device is driven by the dot reverse way even if the display device is driven by the column reverse way. That is, though a polarity of data voltage is reversely supplied per date line, each pixel electrode will have a polarity different from its adjacent pixel electrode not only in a transverse direction but also in a longitudinal direction of the data line. Accordingly, since the display device is driven by the column reverse way, driving at 120 Hz or more is easy. Meanwhile, a cross talk that can be produced when adopting the column reverse way can be effectively suppressed.

Also, an aperture ratio of the display device can be increased through disposing the data line at a center portion of the pixel electrode.

Also, the data line is overlapped with the pixel electrode by a constant area size even if there is an alignment error since the data line is disposed at the center portion of the pixel electrode. Accordingly, the image quality of the display device can be enhanced.

Also, a view angle of the display device can be effectively improved through pre-tilting the liquid crystal molecules by dividing one pixel electrode region into multi domains with various methods.

Also, the view angle of the display device is enhanced further through subdividing the divided domains by finely controlling the data voltage supplied to the pixel electrode.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display device comprising:
a first display substrate which comprises a plurality of pixel electrodes, a plurality of data lines disposed parallel with each other and overlapping a center portion of the pixel electrodes in a direction crossing a longitudinal direction of the data lines in a plan view of the display device, a plurality of gate lines which cross the data lines, and a plurality of driving thin film transistors which are respectively connected with the data lines, the gate lines and the pixel electrodes;
a second display substrate which is disposed opposite to the first display substrate and comprises a common electrode, and;
a liquid crystal layer which is disposed between the first display substrate and the second display substrate;
wherein one of the data lines supplies a data voltage to pixel electrodes overlapped with the one of the data lines and to pixel electrodes overlapped with an adjacent one of the data lines alternately along the longitudinal direction of the data lines.

2. The display device according to claim 1, wherein the pixel electrodes connected to the one of the data lines are supplied with the same polarity of the data voltage and are supplied with a different polarity of the data voltage from the adjacent data lines.

3. The display device according to claim 2, wherein the each driving thin film transistor is connected with only one data line among the plurality of data lines and is disposed at a position corresponding to an edge portion of the each pixel electrode, the one of the data lines is connected alternately with the driving thin film transistors disposed at the opposite sides of the data lines along the longitudinal direction of the data lines and, the plurality of driving thin film transistors are connected with the pixel electrodes disposed at the same side.

4. The display device according to claim 2, wherein the each driving thin film transistor is connected with only one data line among the plurality of data lines and is disposed at a position corresponding to an edge portion of the each pixel electrode, the one of the data lines is connected with the adjacent driving thin film transistors disposed at the same side, and the plurality of driving thin film transistors are connected alternately with the pixel electrodes disposed at opposite sides of the data lines along the longitudinal direction of the data lines.

5. The display device according to claim 2, wherein the pixel electrodes comprise first pixel electrodes and second pixel electrodes which are adjacent to the first pixel electrodes in the longitudinal direction of the data lines and are supplied with the data voltage from the data line adjacent to the one data line, the first pixel electrodes comprise first major pixel electrodes and first minor pixel electrodes and, the second pixel electrodes comprise second major pixel electrode and the second minor pixel electrode.

6. The display device according to claim 5, wherein the plurality of gate lines comprise first gate lines and second gate lines,
the first gate lines comprise a first major gate line supplying a gate signal to the driving thin film transistors connected with the first major pixel electrodes, and first minor gate lines supplying a gate signal to the driving thin film transistors connected with the first minor pixel electrodes, and
the second gate lines comprise second major gate line supplying a gate signal to the driving thin film transistors connected with the second major pixel electrodes, and second minor gate lines supplying a gate signal to the driving thin film transistors connected with the second minor pixel electrodes.

7. The display device according to claim 6, wherein the first major gate lines and the first minor gate lines supply the same gate signal, and
the second major gate lines and the second minor gate lines supply the same gate signal.

8. The display device according to claim 7, wherein the first display substrate further comprises:
a storage electrode line formed parallel with the gate lines;
a storage electrode pad; and
a charging thin film transistor connected with one of the second major gate lines, one of the first minor pixel electrodes and the storage electrode pad.

9. The display device according to claim 6, wherein the first major gate lines and the first minor gate lines supply different gate signals, and
the second major gate lines and the second minor gate lines supply different gate signals.

10. The display device according to claim 5, wherein the first major pixel electrodes and the second major pixel electrodes are directly connected with the driving thin film transistors and,
the first minor pixel electrodes and the second minor pixel electrodes are indirectly connected with the driving thin film transistors through coupling capacitances.

11. The display device according to claim 5, wherein the first display substrate further comprises a color filter disposed between the pixel electrodes and the data lines.

12. The display device according to claim 5, wherein at least one of the pixel electrodes and the common electrode comprise a micro-slit pattern dividing a pixel region disposed with the pixel electrodes into a plurality of domains.

13. The display device according to claim 12, wherein the micro-slit pattern comprises:
- at least one vertical part overlapped with the data lines;
- at least one transverse part crossing the vertical part; and
- a plurality of slant parts extended from at least one of the vertical part and the transverse part.

14. The display device according to claim 13, wherein the liquid crystal layer comprises vertically oriented liquid crystal molecules and ultra violet ray cured type monomer, wherein the micro-slit pattern and the ultra violet ray cured type monomer pre-tilt the liquid crystal molecules in a direction different from each other for the each domain.

15. The display device according to claim 5, wherein at least one of the pixel electrodes and the common electrode comprise a cut pattern, and the cut pattern divides a pixel region of the pixel electrodes into a plurality of domains.

16. The display device according to claim 15, wherein the cut pattern comprises a first cut pattern overlapped parallel with the data lines and a second cut pattern crossing the data lines in a slant direction.

17. The display device according to claim 5 further comprises:
- a first orientation film disposed on the pixel electrodes of the first display substrate; and
- a second orientation film disposed on the common electrode of the second display substrate, and at least one of the first orientation film and the second orientation film divide each pixel electrode into a plurality of domains.

18. The display device according to claim 17, wherein some of boundaries of the plural domains are overlapped parallel with the data lines.

19. A display device comprising:
- a first display substrate which comprises a plurality of pixel electrodes, a plurality of data lines which are disposed parallel with each other and cross a plurality of center portions of the plurality of pixel electrodes in a direction crossing a longitudinal direction of the data lines in a plan view of the display device, a plurality of gate lines which cross the data lines in the plan view of the display device, and a plurality of driving thin film transistors which are respectively connected with one or more of the data lines, the gate lines, and the pixel electrodes, the plurality of pixel electrodes including at least a first pixel electrode, a second pixel electrode, a third pixel electrode, and fourth pixel electrode, the plurality of data lines including at least a first data line and a second data line that is adjacent to the first data line, the first data line overlapping a center portion of the first pixel electrode and overlapping a center portion of the second pixel electrode in the plan view of the display device, the second data line overlapping a center portion of the third pixel electrode and overlapping a center portion of the fourth pixel electrode in the plan view of the display device, the first data line supplying a first data voltage to the first pixel electrode and the fourth pixel electrode without supplying the first data voltage to the second pixel electrode or the third pixel electrode;
- a second display substrate which is disposed opposite to the first display substrate and comprises a common electrode; and
- a liquid crystal layer which is disposed between the first display substrate and the second display substrate.

20. The display device according to claim 19, wherein
the first data voltage has a first polarity and is applied to both the first pixel electrode and the fourth pixel electrode,
the second data line supplies a second data voltage to the third pixel electrode, the second data voltage having a second polarity that is different from the first polarity, and
the third pixel electrode is adjacent to the first pixel electrode and is adjacent to the fourth electrode.

* * * * *